US007952968B2

(12) United States Patent
Jung (10) Patent No.: US 7,952,968 B2
(45) Date of Patent: May 31, 2011

(54) METHOD AND APPARATUS FOR RECORDING DATA IN AN OPTICAL DISK DEVICE

(75) Inventor: Man Young Jung, Osan-si (KR)

(73) Assignee: LG Electronics Inc., Seoul (KR)

( * ) Notice: Subject to any disclaimer, the term of this patent is extended or adjusted under 35 U.S.C. 154(b) by 1158 days.

(21) Appl. No.: 11/698,913

(22) Filed: Jan. 29, 2007

(65) Prior Publication Data
US 2007/0291603 A1 Dec. 20, 2007

(30) Foreign Application Priority Data

Jun. 19, 2006 (KR) .................. 10-2006-0054815
Jun. 19, 2006 (KR) .................. 10-2006-0054818

(51) Int. Cl.
*G11B 7/00* (2006.01)
(52) U.S. Cl. ............ 369/47.5; 369/47.52; 369/47.53; 369/53.18; 369/53.26; 369/59.11
(58) Field of Classification Search ............. 369/47.53, 369/47.5, 47.52, 59.11, 53.18, 53.26
See application file for complete search history.

(56) References Cited

U.S. PATENT DOCUMENTS

| 2002/0024903 A1* | 2/2002 | Sato .................. 369/47.53 |
| 2002/0064110 A1 | 5/2002 | Sato |
| 2002/0141308 A1 | 10/2002 | Matsumoto |
| 2003/0036861 A1* | 2/2003 | Matsumoto ............. 702/60 |
| 2003/0072235 A1 | 4/2003 | Naoi et al. |
| 2003/0086346 A1* | 5/2003 | Fukumoto .............. 369/47.53 |
| 2005/0259537 A1 | 11/2005 | Kim |

FOREIGN PATENT DOCUMENTS

| CN | 1700312 | 11/2005 |
| EP | 1326239 | 7/2003 |
| EP | 1870882 | 12/2007 |
| JP | 2002304729 | 10/2002 |
| JP | 2006114166 | 4/2006 |

OTHER PUBLICATIONS

European Search Report dated Mar. 31, 2008.
Chinese Office Action dated May 22, 2009 with translation.

* cited by examiner

*Primary Examiner* — Wayne R Young
*Assistant Examiner* — Latanya Bibbins
(74) *Attorney, Agent, or Firm* — KED & Associates LLP

(57) ABSTRACT

A method and apparatus for recording data on an optical disk calculates an optical power at a first recording speed, compares the calculated optical power to a predetermined value, and then determines whether to apply the first recording speed based on a result of the comparison. The optical power at the first recording speed is calculated based on a reference optical power and a measured optical power, and the predetermined value may correspond to the maximum allowable power of a laser pickup. The method and apparatus may be used to control the speeding, timing, and/or power of a data recording operation, as well as to compensate for temperature variations and/or power margins of one or more circuits in an optical disk device.

20 Claims, 6 Drawing Sheets

METHOD AND APPARATUS FOR RECORDING DATA IN AN OPTICAL DISK DEVICE

BACKGROUND

1. Field

One or more embodiments described herein relate to an optical disk device.

2. Background

Optical disk devices often use power control techniques in an attempt to more efficiently record data onto optical disks. These techniques take a number of factors into consideration including the recording speed requested by the user and the maximum power limitations of the laser diode used to perform the writing operation. Unfortunately, the power control techniques of the background art are unable to adequately compensate for errors that are introduced into the recording process by temperature fluctuations, excessive recording speed requests, and other influences.

BRIEF DESCRIPTION OF THE DRAWINGS

The embodiments will be described in detail with reference to the following drawings in which like reference numerals refer to like elements wherein.

DETAILED DESCRIPTION

Data recording methods and apparatuses are applicable to various types of optical disks (e.g., digital versatile disk recordable, DVD-R, and digital versatile disk rewritable, DVD-RW) and optical disk devices such as a DVD-recorder (DVD-R). When recording data on an optical disk, one type of optical disk device will access a certain area of the disk such as a power calibration area (PCA). The device will then determine an optimum writing power required for the data recording by performing an optimum power control (OPC) process.

The writing power ultimately used during a write operation may be influenced by the recording speed requested by a user. For example, when the recording speed requested by a user is 4× speed, the optical disk device accesses an inner PCA and determines an optical power value suitable for the 4× recording speed by performing an OPC process at the 4× recording speed.

Figure 1A:
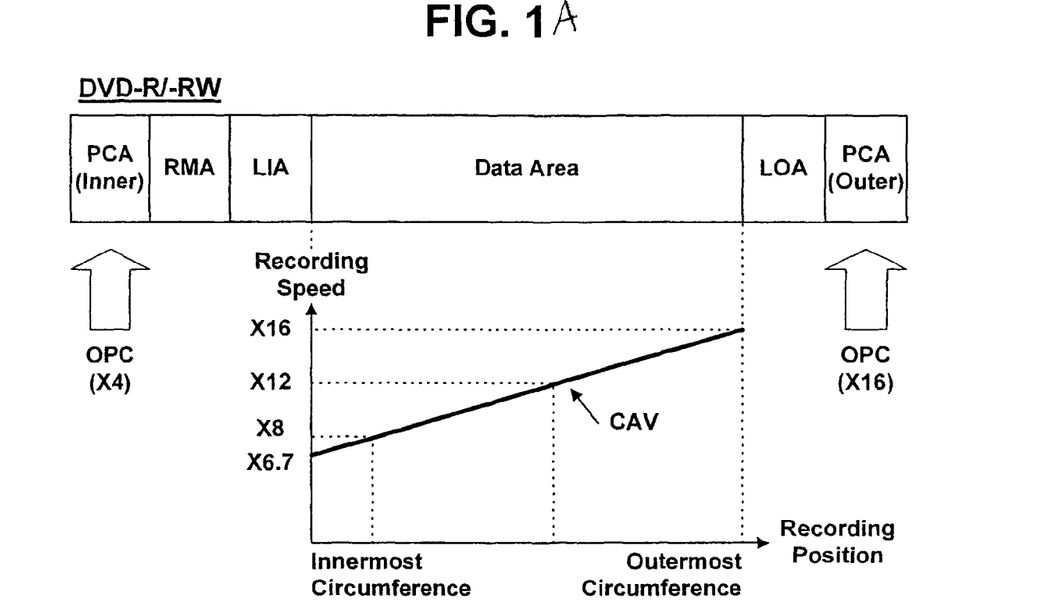
FIG. 1A is a diagram showing how OPC processes are performed for different areas of a disk at different speeds according to one type of data recording process.

When the recording speed requested by a user is more than 4 times (4×) speed (e.g., 16× speed), the optical disk device will first determine an optical power value suitable for the 4× speed by performing the OPC process in the inner PCA, as shown in FIG. 1A. Next, the device will access an outer PCA and then determine an optical power value suitable for the 16× speed by performing the OPC process at the 16× recording speed.

Figure 1B:
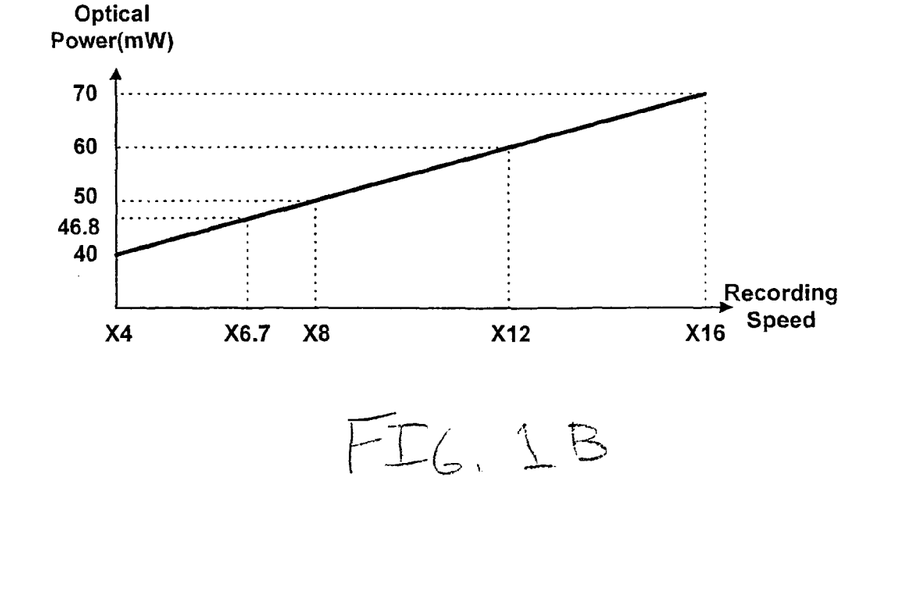
FIG. 1B is a graph showing power value computed for each of the speeds shown in FIG. 1A.

After these operations, the optical disk device will calculate the optical power values suitable for other recording speeds using the 4×-speed optical power value as shown in FIG. 1B. A data recording operation will then be performed by applying the calculated optical power values.

These values are applied as data writing progresses from an inner circumference to an outer circumference of the disk. The radiuses of the innermost circumference and outermost circumference of a data area of a typical disk differ from each other by about 2.4 times. Thus, when the disk rotates at a constant angle velocity (CAV), the linear velocity (recording speed) in the outermost circumference corresponds to about 2.4 times the linear velocity in the innermost circumference. This velocity is limited by the characteristics of the drive motor.

More specifically, a maximum (max) recording speed of an optical disk device is determined by the rotational speed capabilities of the spindle motor, the transfer function of the actuator, and the output power of the laser diode of the device, as well as other factors. The max recording speed may be defined in terms of the recording speed in the outermost circumference.

Accordingly, for a typical disk, the max recording speed in the innermost circumference is about 1/2.4 times the max recording speed of the optical disk device, that is, the max recording speed in the outermost circumference. Thus, for example, when the max recording speed is 16×, the max recording speed in the innermost circumference is 16/2.4=6.7×.

In order to record data on the optical disk while the disk rotates with constant angular velocity, data recording speed must gradually increase. For a typical disk, the recording speed must therefore gradually increase from 6.7×(1/2.4 of 16× speed) speed to 16× speed, as shown in FIG. 1A.

In order to gradually increase recording speed in this manner, optical power may be gradually increased according to optical power values calculated for the range of recording speeds shown in FIG. 1A. For instance, the optical power value may be increasingly adjusted from 46.8 mW at the 6.7× speed in the innermost circumference to 50 mW at the 8× speed, to 60 mW at the 12× speed, and to 70 mW at the 16× speed.

In addition to recording speed, the optical power value required to perform a data writing operation may vary depending on other features such as variations in ambient temperature, e.g., generally more power is required at higher temperatures in order to maintain a constant angular velocity. In addition, since the optical power producible by the laser diode is restricted, the laser power cannot be set to higher indefinitely.

To compensate for these effects, one technique involves reducing the recording speed by one step when it is determined that optical power for a requested recording speed is insufficient. According to this technique, the optical disk device measures the ambient temperature and sets the measured temperature as a basis for reducing the recording speed. When the measured temperature exceeds a certain temperature, recording speed is reduced.

However, since correlation between the optical power suitable for the recording speed and temperature is not proportionally exact, adjusting recording speed using temperature as a guide may not be accurate in some instances. For example, if some maximum temperature is used as a basis to restrict power during a recording operation, the laser diode of the optical disk device may still be able to achieve a higher power even at a temperature which exceeds the maximum allowable temperature. Thus, using temperature as the sole basis for controlling recording power may unnecessarily restrict recording speed, because higher recording speeds may still be attainable in spite of excessive temperatures.

On the other hand, temperature may not be allowed to increase power to levels above the maximum capabilities of the laser. This is shown, for example, in FIG. 2. Specifically, when the optical power value for 4× speed is increased from 40 mW to 45 mW because of increasing temperature in the optical disk device, the optical power value for the 16× speed, which is the max recording speed, increases from 70 mW to 78.75 mW based on the proportional expression of 40:45=70:x.

Figure 2:
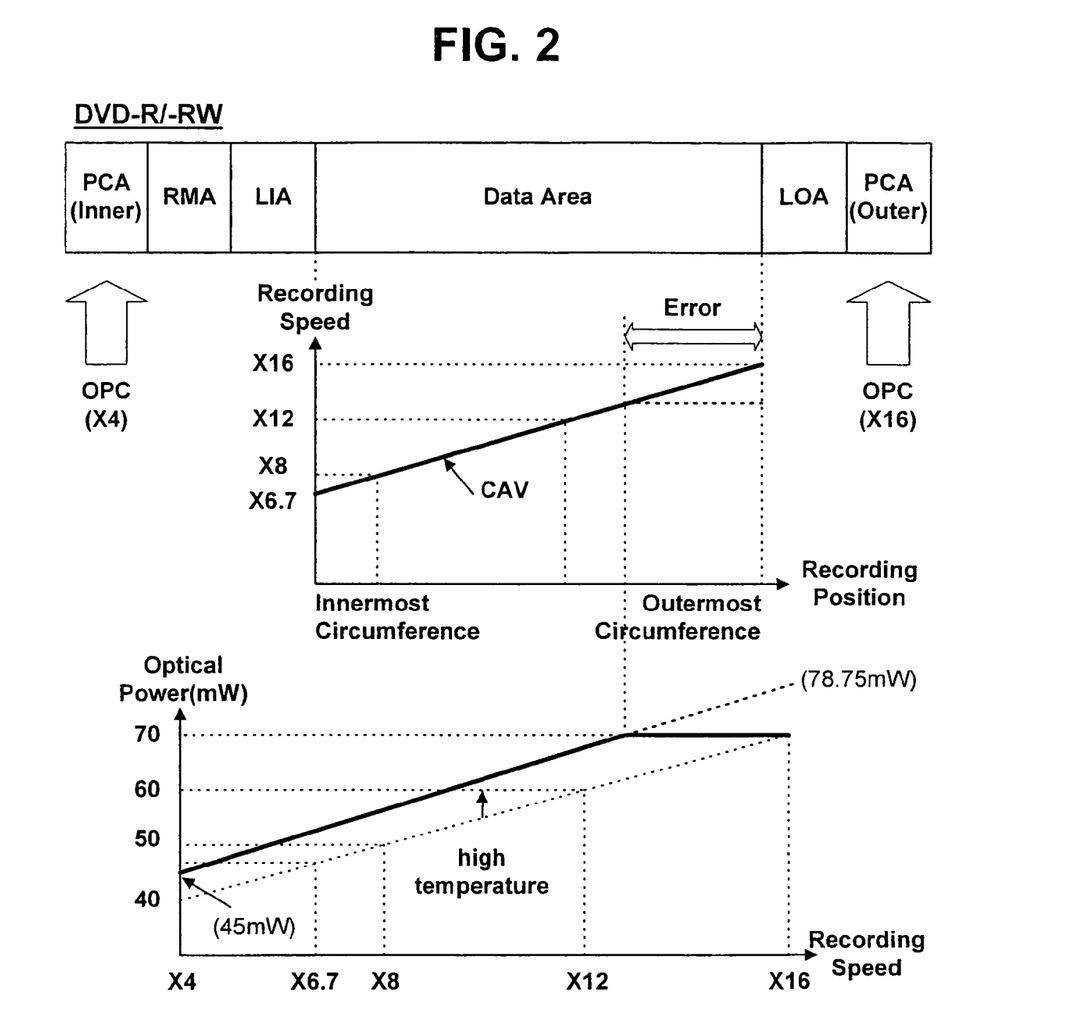
FIG. 2 is a diagram showing an example of error occurring in an outer circumference of a disk due to a lack of optical power during data recording process.

However, if the max laser power value for the laser diode incident on the disk (which is output from an objective lens which converges the laser beam onto a recording layer) is restricted to 70 mW, an optical power value of 78.75 mW is not possible. Consequently, for the 16× speed, data may not be properly recorded on the outer circumference of the optical disk at 16× speed, or the recorded data may not be reproduced normally.

Figure 3:
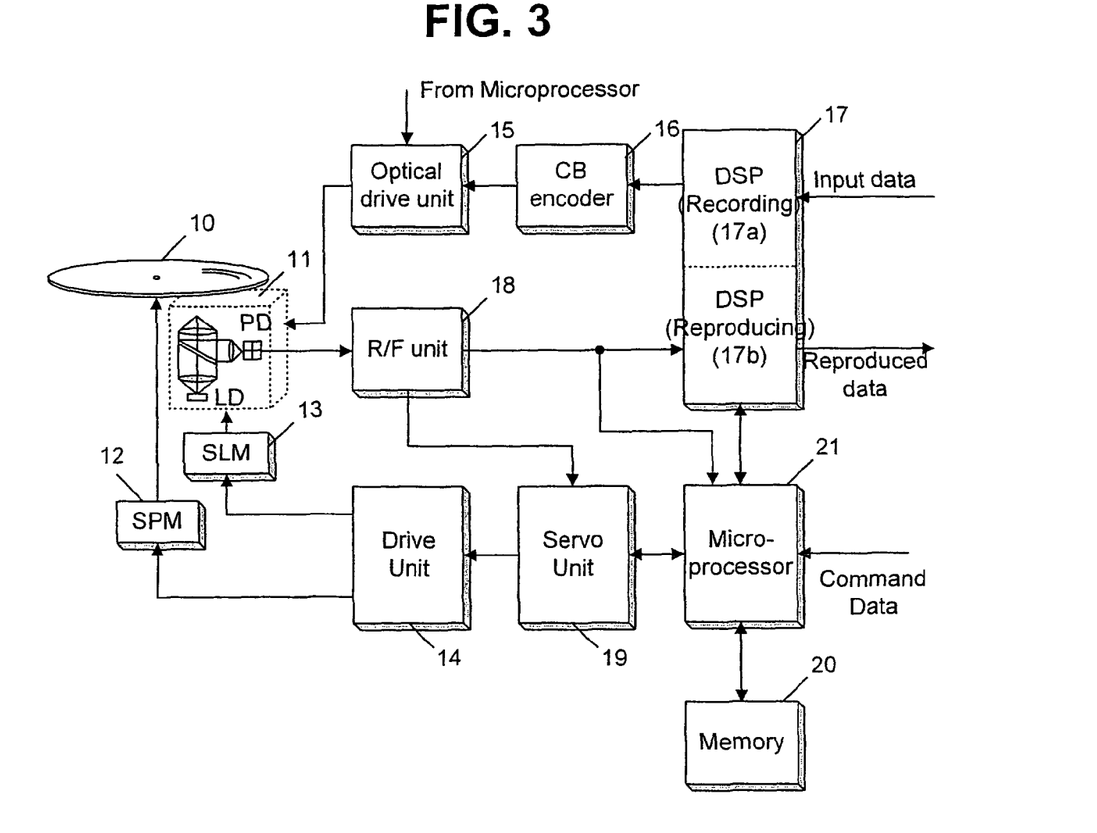
FIG. 3 is a diagram showing an optical disk device.

FIG. 3 shows an optical disk device which achieves improved power and speed control performance. This device includes an optical pickup 11, a spindle motor 12, a sled motor 13, a drive unit 14, an optical drive unit 15, a channel bit (CB) encoder 16, a digital signal processor (DSP) 17, an RF unit 18, a servo unit 19, a memory 20, and a microprocessor 21.

Memory 20 may contain information relating to a reference laser power value suitable for each of a plurality of recording speeds and a maximum (max) laser power that can be produced from a laser diode included in optical pickup 11. Such a memory may be a nonvolatile memory such as EEPROM or flash memory.

When conducting a data recording operation in response to a user's request, microprocessor 21 accesses a certain inner area, for example, the inner PCA of the optical disk (e.g., a DVD-R or DVD-RW), performs an OPC process at a certain recording speed (e.g., 4× speed), and detects an actual optical power value suitable for the certain recording speed by controlling servo unit 19 and optical drive unit 15.

Without executing the OPC process on the outer PCA, the microprocessor predicts an optical power value suitable for the recording speed requested by the user. This is accomplished by comparing the detected actual optical power value and the reference optical power value managed (e.g., stored) in memory 20. The microprocessor, then, determines a max recording speed based on the predicted optical power value and the max optical power value managed (e.g., stored) in the memory, and accordingly performs a data recording method which will now be described in greater detail.

Figure 4:
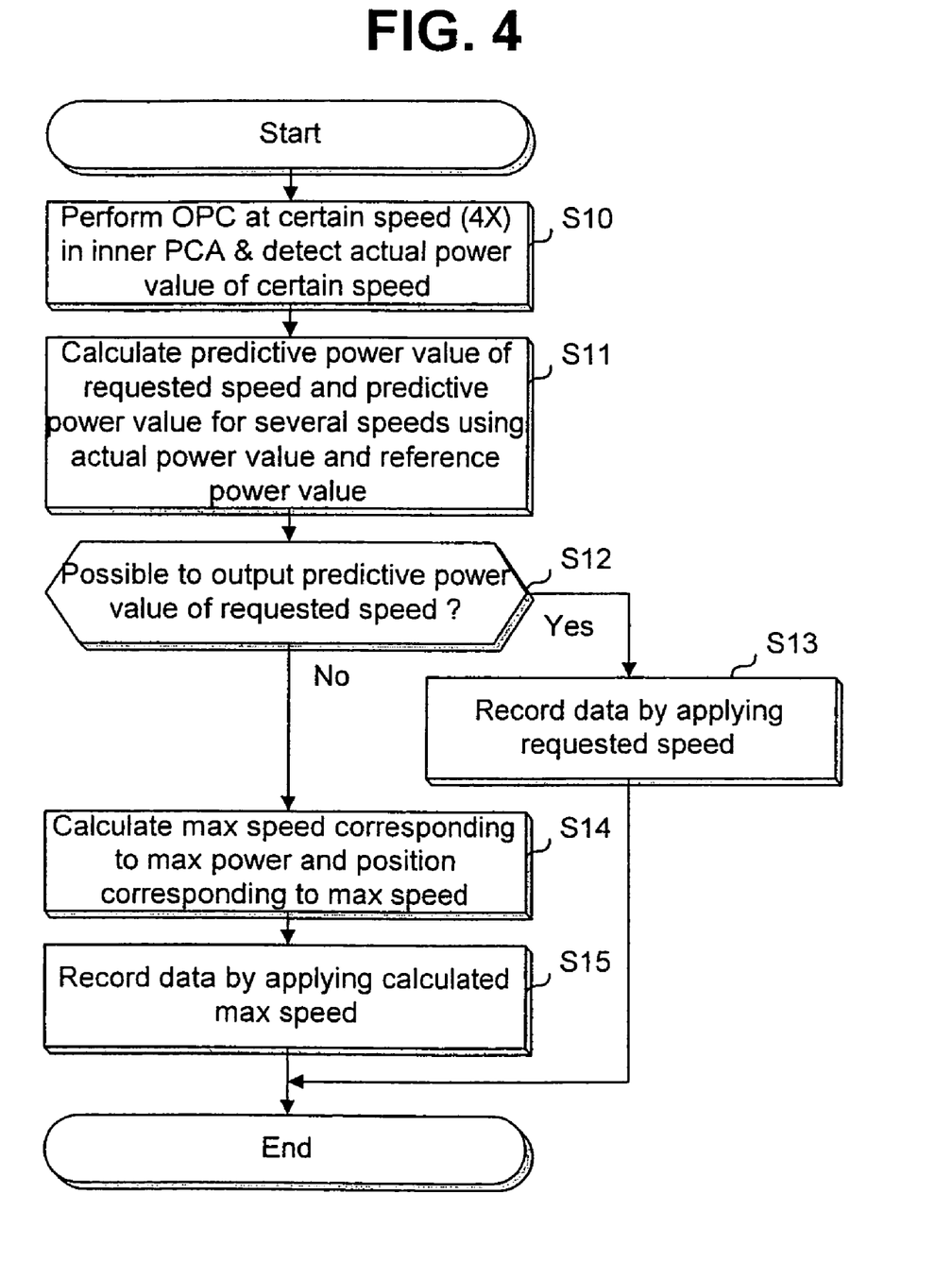
FIG. 4 is a flowchart showing steps included in a data recording method according to one embodiment.

Referring to FIG. 4, prior to performing the data recording method, microprocessor 21 accesses an inner PCA of optical disk 10, performs an OPC process at a certain recording speed, and detects an actual optical power value suitable for the certain recording speed by controlling servo unit 19 and optical drive unit 15 (S10). The certain recording speed may, for example, be a predetermined or default speed, e.g., 4× speed.

Next, the microprocessor calculates a predictive optical power value suitable for the recording speed requested by the user. This calculation may be performed based on a predetermined proportional expression using the detected actual optical power value, a reference optical power value of the certain recording speed managed in the memory, and a reference optical power value at the recording speed requested by the user. Predictive optical power values are then calculated for other recording speeds using the proportional expression (S11).

Figure 5:
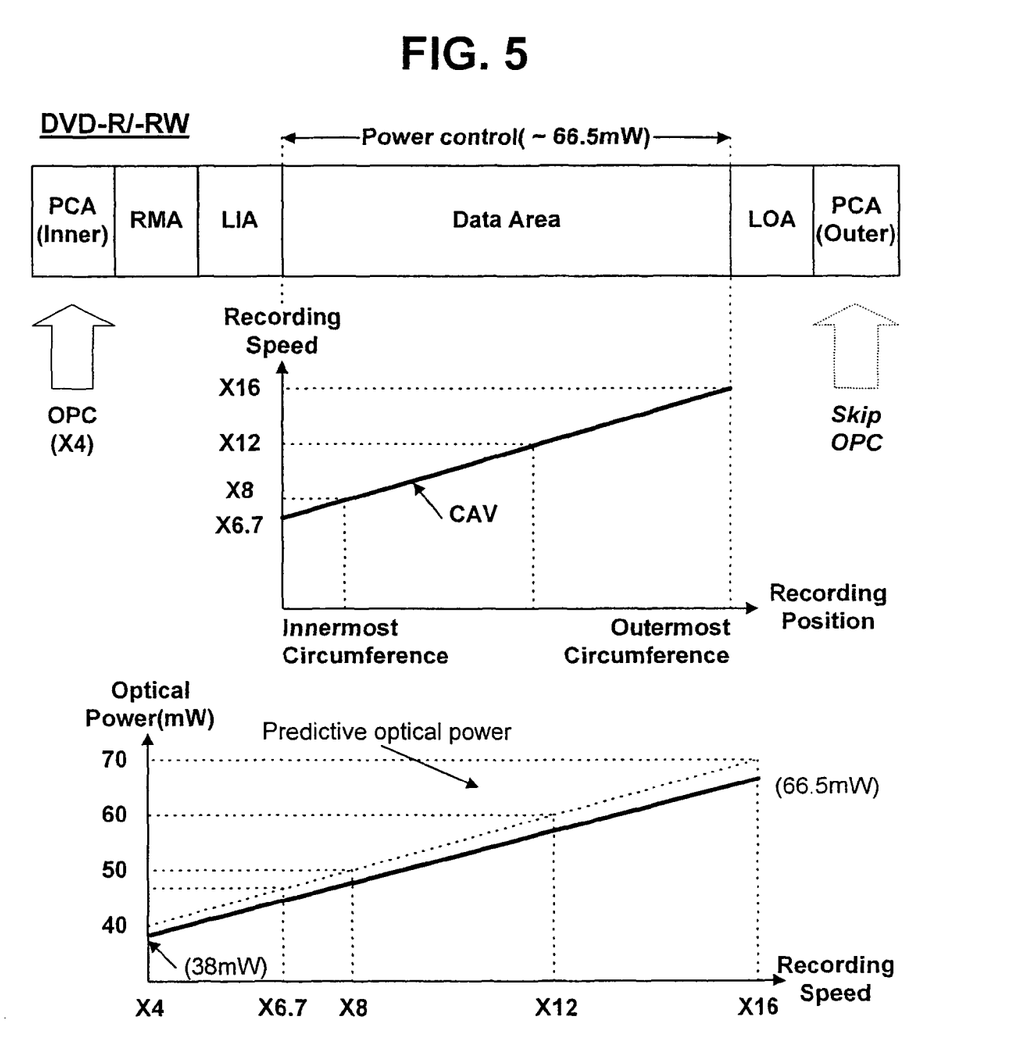
FIGS. 5 and 6 are diagrams showing examples of data recording process performed by the method of FIG. 4.

FIG. 5 shows a first example of how a predictive power value is computed. In this example, due to the OPC process conducted on the inner PCA, the actual optical power value suitable for the 4× speed can be detected to 38 mW, which is lower than the 40 mW value corresponding to the 4×-speed reference optical power value (see dotted lines) managed (e.g., stored) in the memory.

For instance, when the 4×-speed reference optical power value and the actual optical power value are 40 mW and 38 mW respectively, and a reference optical power value for a 16× speed requested by the user is 70 mW, the microprocessor 21 calculates the predictive optical power value for the 16× speed to be x=66.5 mW, based on a proportional expression such as 40:38=70:x.

Next, the microprocessor determines whether the predictive optical power value is supportable by (e.g., within power capabilities of) the laser diode by checking the max optical power value managed in memory 20 (S12). For instance, when the 16×-speed predictive optical power value is 66.5 mW and the checked max optical power value is 70 mW, the microprocessor determines that the calculated predictive optical power value can be output.

Next, the microprocessor omits the OPC process on the outer PCA and performs the optical power control process to execute the data recording operation at 16× speed, which is the recording speed requested by the user. This is accomplished by controlling servo unit 19 and optical drive unit 15 (S13). The data is recorded on the data area of the optical disk in the direction from the inner circumference to the outer circumference while the optical disk rotates at a constant angular velocity corresponding to the 16× speed which is requested by the user.

As data recording proceeds from the inner circumference to the outer circumference, the recording speed gradually increases from 6.7× speed (16/2.4) to the requested 16× speed. The optical power value gradually increases in proportion to the increasing recording speed based on the predictive optical power values for the recording speeds calculated at the step 11.

Figure 6:
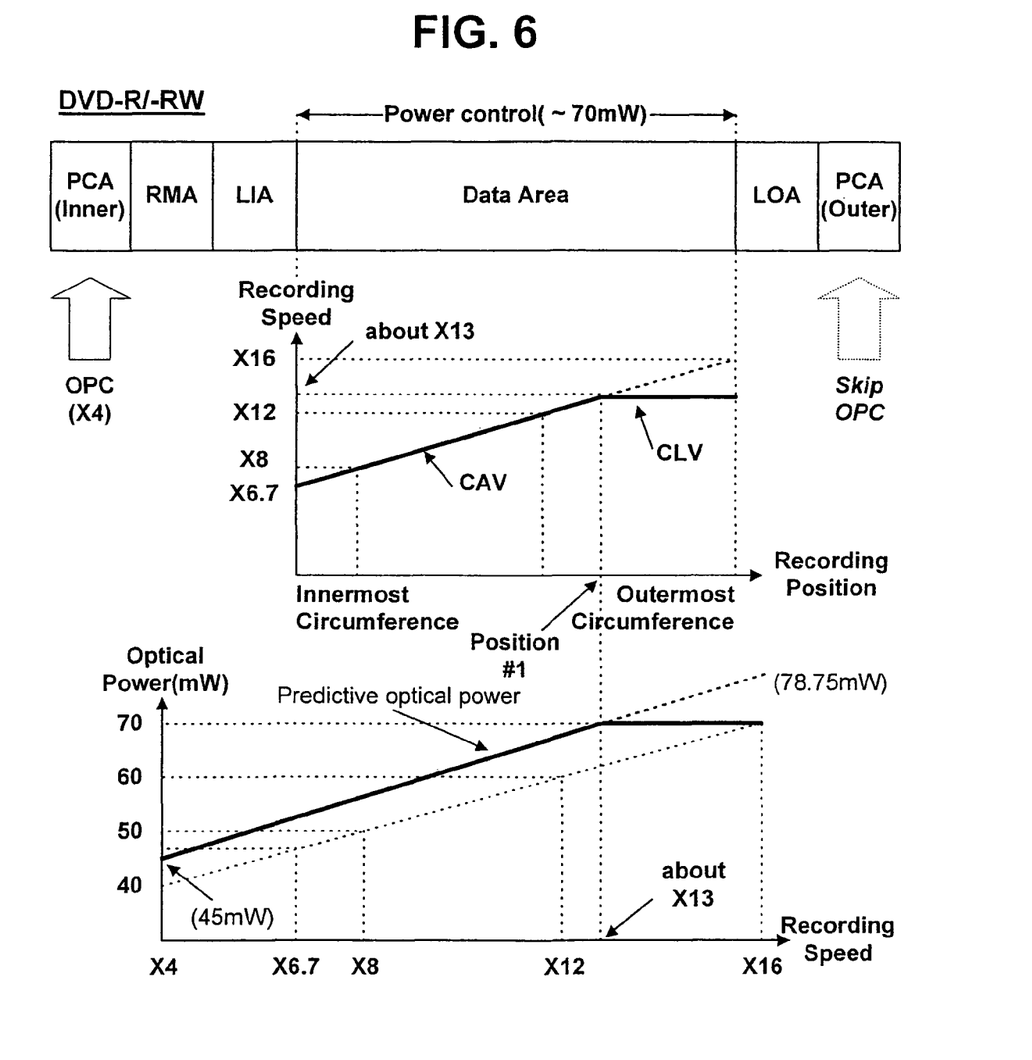

FIG. 6 shows another example of how a predictive power value is computed, taking temperature into consideration. When the temperature in the optical disk device is higher than a normal or predetermined temperature, the actual optical power value for the 4× speed may be detected to 45 mW, which is higher than 40 mW corresponding to the 4×-speed reference optical power value managed in memory 20.

When the 4×-speed reference optical power value and the actual optical power value are 40 mW and 45 mW respectively, and a reference optical power value for a 16× speed requested by the user is 70 mW, the microprocessor calculates the predictive optical power value for the 16× speed to be x=78.75 mW, based on a proportional expression such as 40:45=70:x (S11).

Alternatively, the predictive optical power value for the 16× speed can be calculated based on the relationship between the recording speed and the reference optical power value managed in the memory (the linear function represented as a straight line with a constant slope), and the detected 4×-speed actual optical power value. By way of example, since it can be assumed that the slope of the recording speed curve and the optical power value curve does not change significantly as a result of other elements in FIG. 6, the predictive optical power value for the 16× speed can be calculated to be 75 mW. This may be accomplished by adding the reference optical power value of 70 mW and 5 mW, which is the difference between the actual optical power value and the reference optical power value at the 4× speed.

Next, the microprocessor determines whether the predictive optical power value is supported by the laser diode (e.g., whether the predictive value exceeds a power capability of the laser) by checking the max optical power value managed in memory 21 (S12). For instance, when the predictive 16×-speed optical power value is 78.75 mW and the checked max optical power value is 70 mW, the microprocessor determines that the predictive optical power value is not producible and that therefore data recording at the 16× recording speed requested by the user is not possible.

In this case, the microprocessor determines the actual power value for the max recording speed to be the max reference optical power value of 70 mW, taking into account of the detected 4×-speed actual optical power value (S14).

That is, the microprocessor computes a predictive optical power, p, of 62.2 mW which corresponds to the optical power value of 70 mW based on the proportional expression of 40:45=p:70. The microprocessor further acquires a recording speed corresponding to the acquired optical power value of 62.2 mW in accordance with a first linear function of p=(70−40)/(16−4)(x−4)+30=2.5x+30, which is derived from the recording speed x and the reference optical power value managed in memory 20. When 62.2=2.5x+30, the detected max recording speed x is determined to be 12.9, which is about 13× recording speed.

Assuming that the slope of the recording speed and the optical power value is not changed greatly by other elements, when the max optical power value of 70 mW is set to the actual optical power value, the corresponding recording speed may be acquired in another way as follows.

The microprocessor 21 acquires a second linear function, p=2.5(x−4)+45, between the recording speed x and the predictive (or actual) optical power value p using the first linear function of p=2.5x+30 and the detected 4×-speed actual optical power value of 45 mW. The recording speed corresponding to the max optical power value of 70 mW is then acquired using the second linear function. Thus, for 70=2.5(x−4)+45, the max recording speed x is 14× speed.

As such, when the recording speed corresponding to the max optical power value is determined, the microprocessor performs the data recording operation on the optical disk by applying the predictive optical power values for the recording speeds calculated at the step 12 and the recording speed calculated at the step 14, all without performing an OPC process on the outer PCA as shown in FIG. 6 (S15).

In doing so, the data can be recorded on the optical disk in the direction from the inner circumference to the outer circumference while rotating the optical disk with the max recording speed calculated at the step 14 (the recording speed on the outermost circumference), for example, with the angular velocity corresponding to 13× speed. In this situation, the recording speed throughout the inner circumference and the outer circumference is reduced proportional to the rate of the decreasing max recording speed, and the optical power value needs to be adjusted accordingly. In other words, the data recording operation commences at the recording speed which is about 1/2.4 of the max recording speed on the innermost circumference, and data is recorded on the outermost circumference at the max recording speed.

In contrast, data recording can be executed from the inner circumference to the outer circumference of the optical disk while rotating the optical disk at the angular velocity corresponding to the user's requested speed (or the max speed allowed by the device), for example, the 16× speed. In this case, error may occur because of a lack of optical power, since data is recorded on the outermost circumference at 16× speed which is higher than the max recording speed calculated at the step 14.

To prevent this, the optical disk should rotate while reducing the angular velocity with the constant linear velocity (CLV), in order to maintain the max recording speed at the position corresponding to the max recording speed, that is, from Position #1 in FIG. 6.

To calculate Position #1, r1, corresponding to the max recording speed calculated at step 14, the expression r1=r1* (Sc/Sm) is acquired from the proportional expression r1:r2=Sc:Sm. Here, r2 is the outermost circumference radius, Sm is the max recording speed allowed by the device on the outermost circumference, and Sc is the max recording speed calculated at step 14. The position corresponding to the max recording speed may be calculated together with the max recording speed at step 14.

The former suffers less load with respect to the spindle servo of the optical disk but requires more time for the data recording. The latter places a load on the spindle servo (since the rotation of the optical disk is changed from the CAV to the CLV as data recording proceeds from the inner circumference to the outer circumference), but reduces data recording time. Generally, since users prefer the reduction of the recording time, the latter may be considered more advantageous in some instances.

During data recording, the microprocessor controls writing of the data while controlling rotation of the optical disk at the constant angular velocity corresponding to the 16× speed requested by the user. This continues from the innermost circumference of the disk up to the calculated position by controlling servo unit 19 and optical drive unit 15. During this time, the recording speed increases from 6.7× speed (16/2.4) to the 13× speed, which is the calculated max recording speed. The gradually increasing optical power value is applied to data recording in proportion to the increasing recording speed based on the predictive optical power values for the recording speeds calculated at step 11.

Additionally, the microprocessor writes the data while rotating the optical disk in a CLV mode in order to maintain the max recording speed calculated at step 14. This occurs from the calculated position to the outermost circumference by controlling the servo unit and the optical drive unit. In so doing, the predictive optical power value for the max recording speed calculated at step 14, that is, the max optical power value of 70 mW, is sustained.

The method and apparatus can therefore prevent data recording error on the outer circumference of the optical disk while simultaneously improving recording performance. Data recording operations can also be carried out more rapidly by omitting the optimum power calculation in the outer circumference of the optical disk. Moreover, the temperature sensor used in many background-art applications may be eliminated, making the design and cost of an optical device in accordance with embodiments described herein more affordable and efficient.

In accordance with another embodiment, a data recording method in an optical disk device includes calculating an optical power at a first recording speed based on a reference optical power and a measured optical power; comparing the calculated optical power with a certain value; and determining whether to apply the first recording speed according to a result of the comparison.

The measured optical power may be an optical power at a second recording speed which is lower than the first recording speed, and be measured through a power detection process performed on a certain inner area of an optical disk. The optical power at the first recording speed may be calculated in accordance with a proportional expression using the optical power measured for the second recording speed, a reference optical power for the second recording speed, and a reference optical power for the first recording speed.

The reference optical power and the certain value may be stored in a nonvolatile memory of the device by the recording speed. The reference optical power may be stored by the recording speed, and the certain value may indicate a max optical power allowed by the device.

The data may be recorded on the optical disk while increasing the recording speed from a recording speed smaller than the first recording speed up to the first recording speed when the calculated optical power is smaller than the certain value. At this time, the optical disk may rotate at a constant angular velocity.

A third recording speed, which is smaller than the first recording speed, corresponding to the certain value may be determined using the optical power measured for the second recording speed which is smaller than the first recording speed and reference optical powers for two or more recording speeds including the second recording speed when the calculated optical power is greater than the certain value. The data may be recorded on the optical disk while increasing the recording speed from a recording speed smaller than the third recording speed up to the third recording speed.

The recording speed may increase up to the third recording speed to a certain position during the data recording, and the third recording speed may be maintained after the certain position. The optical disk may rotate at a constant angular velocity up to the certain position and rotate at a constant linear velocity after the certain position. The certain value may be applied to the data recording. The certain position may be calculated based on the first recording speed, the third recording speed, and a radius of the outermost area of the data recording.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method for recording data on an optical disk, comprising:
    determining a power value for a first recording speed;
    computing a power value for a second recording speed based on the power value determined for the first recording speed, wherein the power value for the second recording speed is computed based on the power value determined for the first recording speed, a reference power value at the first recording speed, and a reference power value at the second recording speed;
    comparing the power value computed for the second recording speed to a predetermined value; and
    recording data on the optical disk based on a result of the comparison.

2. The method of claim 1, wherein the second recording speed is greater than the first recording speed.

3. The method of claim 2, wherein the power value for the first recording speed is determined based on an OPC process performed for a first circumferential area of the disk.

4. The method of claim 3, wherein the first circumferential area is an inner circumferential area of the disk.

5. The method of claim 3, wherein the power value for the second recording speed is computed for a second circumferential area of the disk.

6. The method of claim 5, wherein the second circumferential area is an outer circumferential area of the disk.

7. The method of claim 6, wherein the power value for the second recording speed is computed without performing an OPC process for said outer circumferential area.

8. The method of claim 1, wherein the power value for the second recording speed is computed based on a product of the reference power value at the second recording speed and a ratio of the power value determined for the first recording speed and the reference power value at the first recording speed.

9. The method of claim 1, wherein the second recording speed is a recording speed requested by a user.

10. The method of claim 1, wherein the second recording speed corresponds to a maximum recording speed attainable by an optical disk device used to record data on the disk.

11. The method of claim 1, wherein the predetermined value corresponds to a prescribed power of a laser used to record data on the disk.

12. The method of claim 11, wherein the prescribed power is a maximum power of the laser.

13. The method of claim 1, wherein the power value for the second recording speed is computed to compensate for temperature variations.

14. A method for recording data on an optical disk, comprising:
    determining a power value for a first recording speed;
    computing a power value for a second recording speed based on the power value determined for the first recording speed;
    comparing the power value computed for the second recording speed to a predetermined value; and
    recording data on the optical disk based on a result of the comparison,
    wherein, when the power value computed for the second recording speed lies outside a range relative to the predetermined value, said method further comprises:
    comparing the power value determined at the first recording speed to a reference value for the first recording speed to generate a compensation value; and
    computing a corrected power value for the second recording speed based the compensation value.

15. The method of claim 14, further comprising:
    comparing the corrected power value for the second recording speed to the predetermined value; and recording data on the disk based on a result of said comparison.

16. The method of claim 15, wherein, when the corrected power value lies outside a range relative to the predetermined value, said method further comprises:
   computing another corrected power value for the second recording speed based on the reference power value for the first recording speed, a reference power value for the second recording speed, and the power value determined for the first recording speed; and
   determining a third recording speed based on said another corrected power value, the third recording speed being less than the second recording speed.

17. The method of claim 16, wherein the third recording speed is computed based on solving the following linear function for RS:

$$P=M\cdot(RS-Q)+C$$

where P corresponds to said another corrected power value, M is based on a ratio of a difference between reference powers values at the first and second recording speeds and a difference between the first and second recording speeds, Q corresponds to the first recording speed, and C is a constant value.

18. The method of claim 17, wherein recording the data includes:
   recording the data on the disk based on a first range of power values for speeds between the first recording speed and the third recording speed; and
   recording data on the disk using a substantially constant power corresponding to said another corrected power value for speeds between the third recording speed and the second recording speed, wherein the first range of power values includes power values lying between the power value determined for the first recording speed and said another corrected power value.

19. The method of claim 18, wherein the data is recorded from an inner circumferential area to an outer circumferential area of the disk while the disk is rotating at a substantially constant angular velocity.

20. An apparatus for recording data on an optical disk, comprising:
   a pickup;
   a spindle motor to rotate the disk; and
   a controller to control recording of data on the disk, the controller:
   determining a power value for a first recording speed;
   computing a power value for a second recording speed based on the power value determined for the first recording speed; and
   comparing the power value computed for the second recording speed to a predetermined value; and
   controlling recordation of data on the disk based on a result of the comparison,
   wherein the power value for the second recording speed is computed based on the power value determined for the first recording speed, a reference power value at the first recording speed, and a reference power value at the second recording speed.

* * * * *